United States Patent [19]

Arvanitakis et al.

[11] Patent Number: 5,005,939
[45] Date of Patent: Apr. 9, 1991

[54] OPTOELECTRONIC ASSEMBLY

[75] Inventors: Nicolaos C. Arvanitakis, Vestal, N.Y.; Vincent J. BLack, Austin, Tex.; Richard E. Corley, Jr., Lexington, Ky.; Richard G. Nolan, Binghamton, N.Y.; Leonard T. Olson, Jr., Centerville, Va.

[73] Assignee: International Business Machines Corporation, Armonk, N.Y.

[21] Appl. No.: 499,238

[22] Filed: Mar. 26, 1990

[51] Int. Cl.⁵ .............................................. G02B 6/42
[52] U.S. Cl. ................................ 350/96.20; 350/96.15; 357/80
[58] Field of Search ............... 350/96.15, 96.17, 96.20; 250/227, 552; 357/17, 19, 30, 74, 80

[56] References Cited

U.S. PATENT DOCUMENTS

| | | | |
|---|---|---|---|
| 3,792,284 | 2/1974 | Kaelin | 350/96.20 X |
| 4,072,399 | 2/1978 | Love | 350/96.16 |
| 4,249,265 | 2/1981 | Coester | 455/604 |
| 4,268,756 | 5/1981 | Crouse et al. | 250/551 |
| 4,273,413 | 6/1981 | Bendiksen et al. | 350/96.20 |
| 4,427,879 | 1/1984 | Beecher et al. | 250/215 |
| 4,547,039 | 10/1985 | Caron et al. | 350/96.20 |
| 4,549,314 | 10/1985 | Masuda et al. | 455/618 |
| 4,611,886 | 9/1986 | Cline et al. | 350/96.20 |
| 4,625,333 | 11/1986 | Takezawa et al. | 455/612 |
| 4,647,148 | 3/1987 | Katagiri | 350/96.20 |
| 4,707,067 | 11/1987 | Haberland et al. | 350/96.20 |
| 4,719,358 | 1/1988 | Matsumoto et al. | 251/604 |
| 4,737,008 | 4/1988 | Ohyama et al. | 350/96.20 |
| 4,753,508 | 6/1988 | Meuleman | 350/96.20 |
| 4,755,017 | 7/1988 | Kapany | 350/96.18 |
| 4,762,388 | 8/1988 | Tanaka et al. | 350/96.20 |
| 4,767,171 | 8/1988 | Keil et al. | 350/96.18 |
| 4,767,179 | 8/1988 | Sampson et al. | 350/96.20 |
| 4,798,440 | 1/1989 | Hoffer et al. | 350/96.20 |
| 4,807,956 | 2/1989 | Tournereau et al. | 350/96.20 |

Primary Examiner—John D. Lee
Assistant Examiner—Phan T. Heartney
Attorney, Agent, or Firm—Lawrence R. Fraley

[57] ABSTRACT

An optoelectronic assembly for providing bidirectional data transmission between fiber optic means (e.g., a pair of optical fibers) and an electrical circuit member (e.g., a printed circuit board). The assembly includes a two-part housing with first and second receptacle sections designed for accommodating a pair of optoelectronic devices. One of these devices serves as a receiver and the other a transmitter. These devices are aligned within the housing and electrically connected to a substrate member (e.g., ceramic) also positioned within the housing. The substrate provides the necessary electrical functioning and is in turn electrically connected (e.g., via conductor pins) to the described circuit member, this connection occurring through an opening within the bottom portion of the two-part housing. The assembly is designed for coupling with individual optical fiber members or, alternatively with a common duplex connector having optical fibers therein.

25 Claims, 4 Drawing Sheets

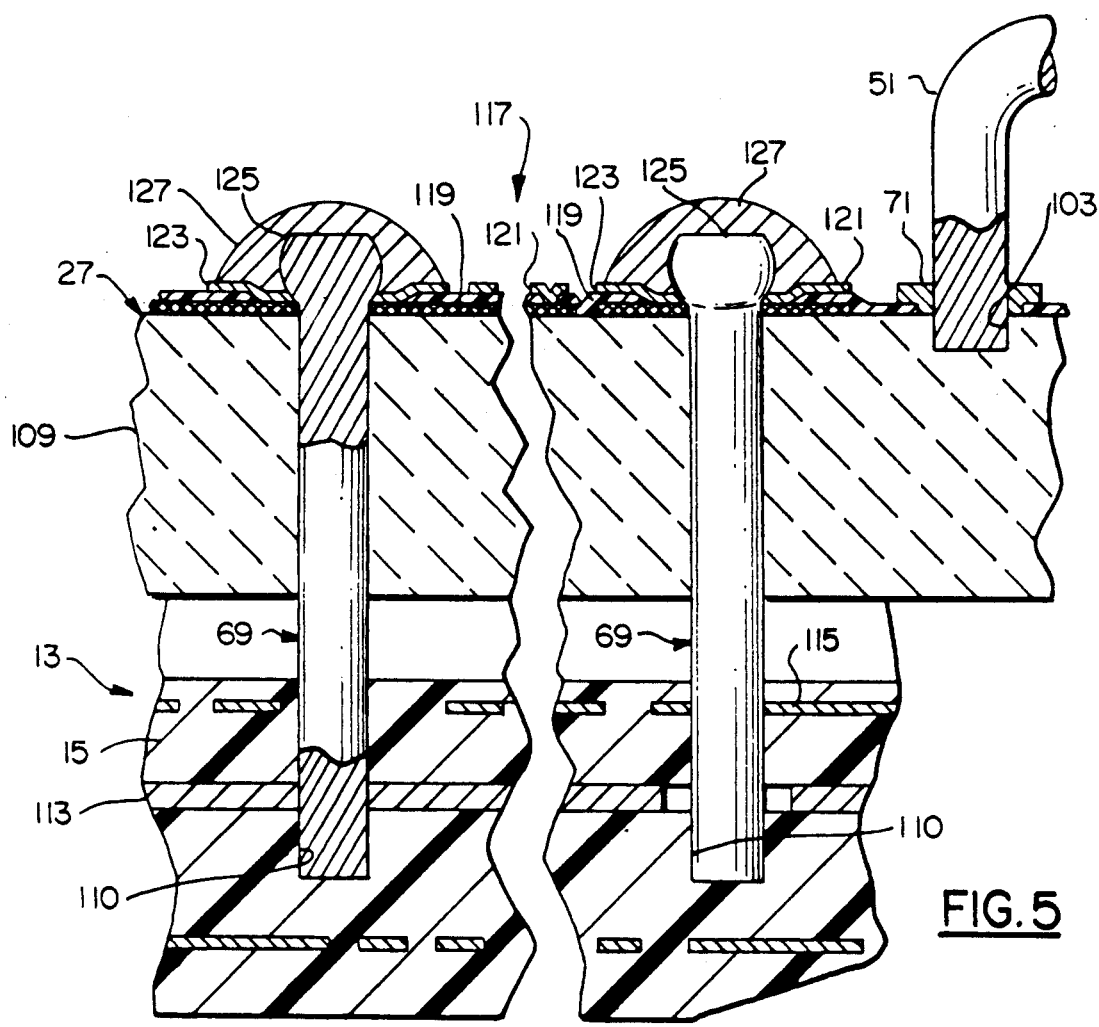
FIG. 5
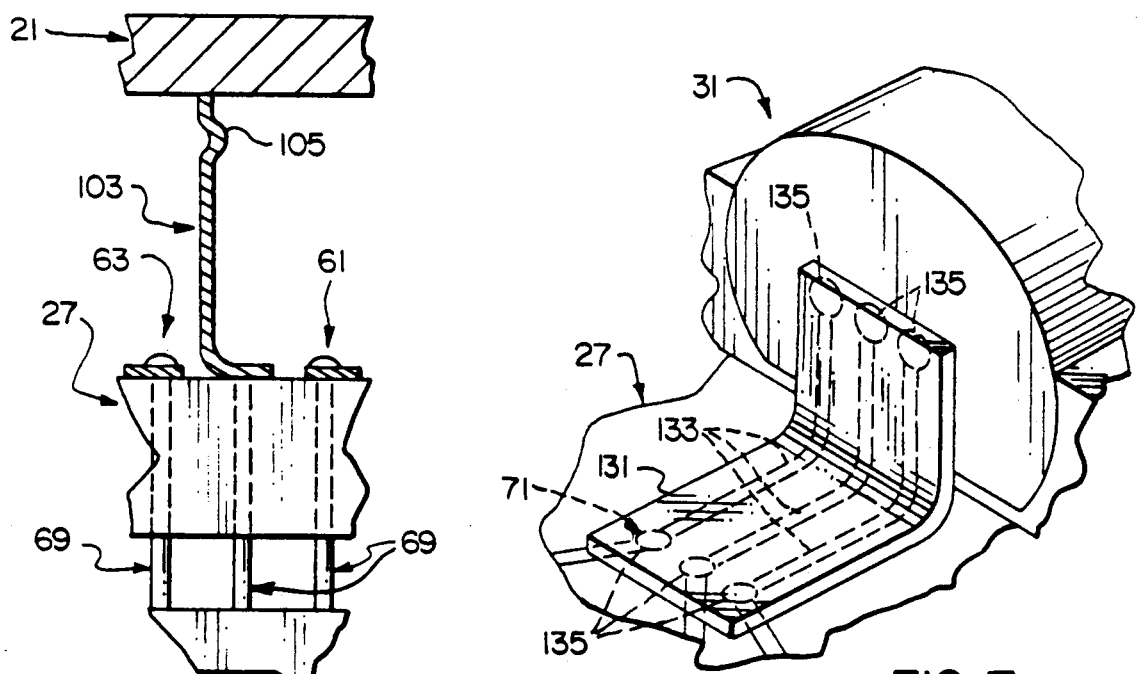
FIG. 6
FIG. 7

5,005,939

OPTOELECTRONIC ASSEMBLY

TECHNICAL FIELD

The invention relates to optoelectronic data transmission and particularly to optoelectronic assemblies for providing same. Even more particularly, the invention relates to such assemblies for use in information handling systems (computers) and the like.

BACKGROUND

Manufacturers and those who utilize information handling systems have become extremely interested in the utilization of optical fibers as a means for transmitting data information. Advantages of using optical fibers over other kinds of transmission media (e.g., electrical wiring) are well known. For example, optical systems are highly resistant to electromagnetic interference which occasionally plagues systems using electrical cables. Additionally, optical systems are considered more secure than known electrical systems since it is substantially more difficult for unauthorized personnel to tap or access an optical fiber without being detected.

As is further known, optical fibers transmit data information using single or multiple strands of fibers each having an inner circular glass core coated with a circumferential cladding having a different index of refraction from that of the core. Light is transmitted along the core and reflected internally at the cladding. Transmissions lines (e.g., optical fibers) used in information handling systems known today are formed of either a single fiber or a plurality (bundle) of such fibers encased within a protective sheath. As also known, such fibers are coupled to various fiber optic connector assemblies and utilized within computers in selected manners.

As will be defined hereinbelow, the invention describes an optoelectronic assembly which provides bidirectional data transmission between fiber optic means (e.g., optical fibers) and an electrically conducting circuit member (e.g., printed circuit board) which in turn may form part of a larger, overall information processor (e.g., computer). The invention thus serves to link fiber optic communication apparatus with electrical information processing apparatus and thus obtain the advantages associated with optical fiber transmission (e.g., as stated above).

Examples of various means for providing connections between optical fiber means (e.g. cables) and electronic circuitry are illustrated in U.S. Pat. Nos. 4,273,413 (Bendiksen et al), 4,547,039 (Caron et al), 4,647,148 (Katagiri) and 4,707,067 (Haberland et al).

As will be defined below, the optoelectronic assembly of the present invention includes a two-part housing including a base portion with receptacle sections therein, each of which is designed for having one of two optoelectronic devices (transmitter or receiver) therein. The housing thus assures precise alignment of these devices with respect to the optical fibers (typically contained in a suitable connector) being coupled thereto as well as the remaining internal components of the assembly. Also within the housing is a substrate (e.g., ceramic) which includes two circuitized sections, each section being electrically connected to a respective optoelectronic device for providing selected functions with respect thereto. This substrate in turn is adapted for being electrically coupled to a electrical circuit member (e.g., printed circuit board) to thus complete the optical-electrical connection. The invention as defined is of relatively simple construction, is relatively easy to assemble (thus making it readily adaptable to mass production) and, because of its construction, is capable of operating at relatively high frequencies (e.g. within the range of about five megahertz to approximately two gigahertz).

It is believed that an optoelectronic assembly possessing the above and other advantageous features would constitute a significant advancement in the art.

DISCLOSURE OF THE INVENTION

It is, therefore, a primary object of the present invention to enhance the data transmission art, and particularly the art involving data transmission between fiber optics and electrical processing components.

It is a more particular object of this invention to provide an optoelectronic assembly which possesses the several advantages cited above as well as others discernible from a reading of this disclosure.

In accordance with one aspect of the invention there is provided an optoelectronic assembly for providing bidirectional data transmission between fiber optic means (e.g., optical fiber members) and an electrical circuit member (e.g., printed circuit board), the assembly comprising a housing including a base portion with first and second receptacle sections therein and a cover portion for being attached to the base portion, a first optoelectronic device (e.g., transmitter) positioned within the first receptacle portion of the housing for receiving electrical data signals and for converting these to optical data transmission signals, a second optoelectronic device (e.g., receiver) positioned within the base portion's second receptacle portion for receiving optical data transmission signals (from the fiber optic means) and for converting these to electrical data signals, and a substrate member positioned within the housing relative to both optoelectronic devices. The substrate member (e.g., ceramic) includes two circuitized sections, the first of which is electrically connected to the first optoelectronic device for providing the electrical data signals thereto, and the second of which is electrically connected to the second optoelectronic device for receiving the converted electrical data signals from this second device.

BRIEF DESCRIPTION OF THE DRAWINGS

FIG. 5 is a side elevational view, on a much enlarged scale and in section, illustrating the electrical connections provided by the invention between one of the invention's optoelectronic devices and the substrate member contained within the invention's housing. Electrical connections between the substrate and the electrical circuit member are also shown;

FIG. 6 is a partial view, in section and on a much enlarged scale, illustrating the radio frequency (RF) shield means as used on the substrate of the invention and illustrating how this shield means engages the cover portion of the invention's housing. This view also illustrates the electrical connection between the shield means of the invention and the circuitry which forms part of the invention's substrate; and FIG. 7 is a partial view, on a much enlarged scale, illustrating one version of providing electrical connection between the optoelectronic devices as used in the invention and the circuitry which forms part of the invention's substrate member.

BEST MODE FOR CARRYING OUT THE INVENTION

For a better understanding of the present invention, together with other and further objects, advantages and capabilities thereof, reference is made to the following disclosure and appended claims in connection with the above described drawings.

Figure 1:
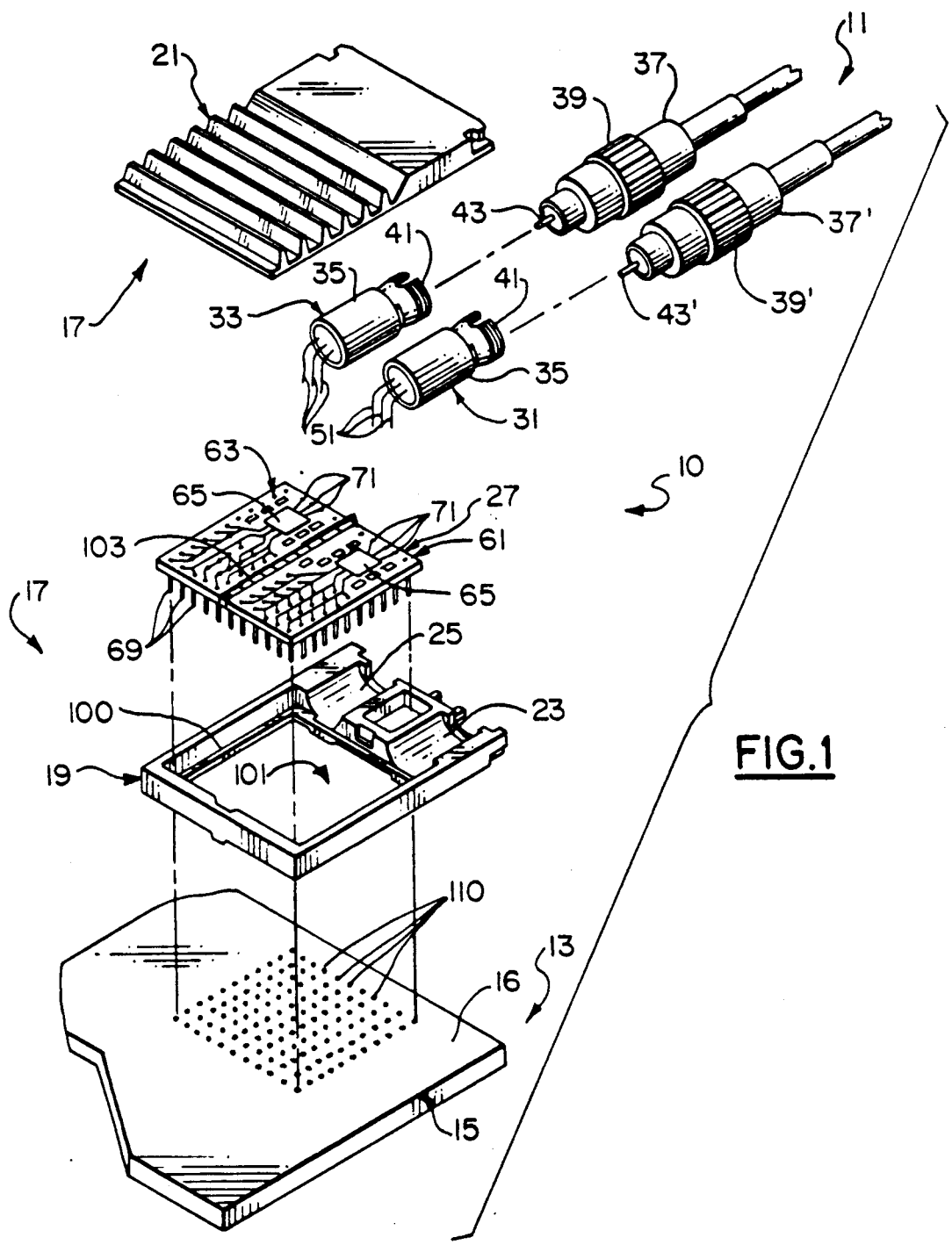
FIG. 1 is an exploded perspective view of an optoelectronic assembly in accordance with one embodiment of the invention, the assembly shown capable of providing interconnection between two optical fiber members and an electrical circuit member.

In FIG. 1, there is shown an optoelectronic assembly 10 in accordance with one embodiment of the invention. Assembly 10, as defined, is capable of providing bidirectional data transmission between fiber optic means 11 and an electrical circuit member 13 (e.g., printed circuit board 15). As such, assembly 10 thus provides an interconnection between optic means 11 wherein optical inputs are provided and an electrical conductor wherein converted optical signals are processed. By way of example, the circuit member 13 may form part of a larger information handling system (computer) of a type known in the art. The circuit member 13 may be electrically connected to the remaining electrical circuitry of such a processor by known connection means (e.g., a circuit board connector of the zero insertion force variety). As further defined, assembly 10 receives optical input from optic means 11 and converts this input to electrical signals for subsequent processing (e.g., by the processor to which the circuit member 13 is electrically connected). Assembly 10 further provides means whereby electrical signals from the processor are converted to optical signals and transmitted out through optic means 11.

Figure 2:
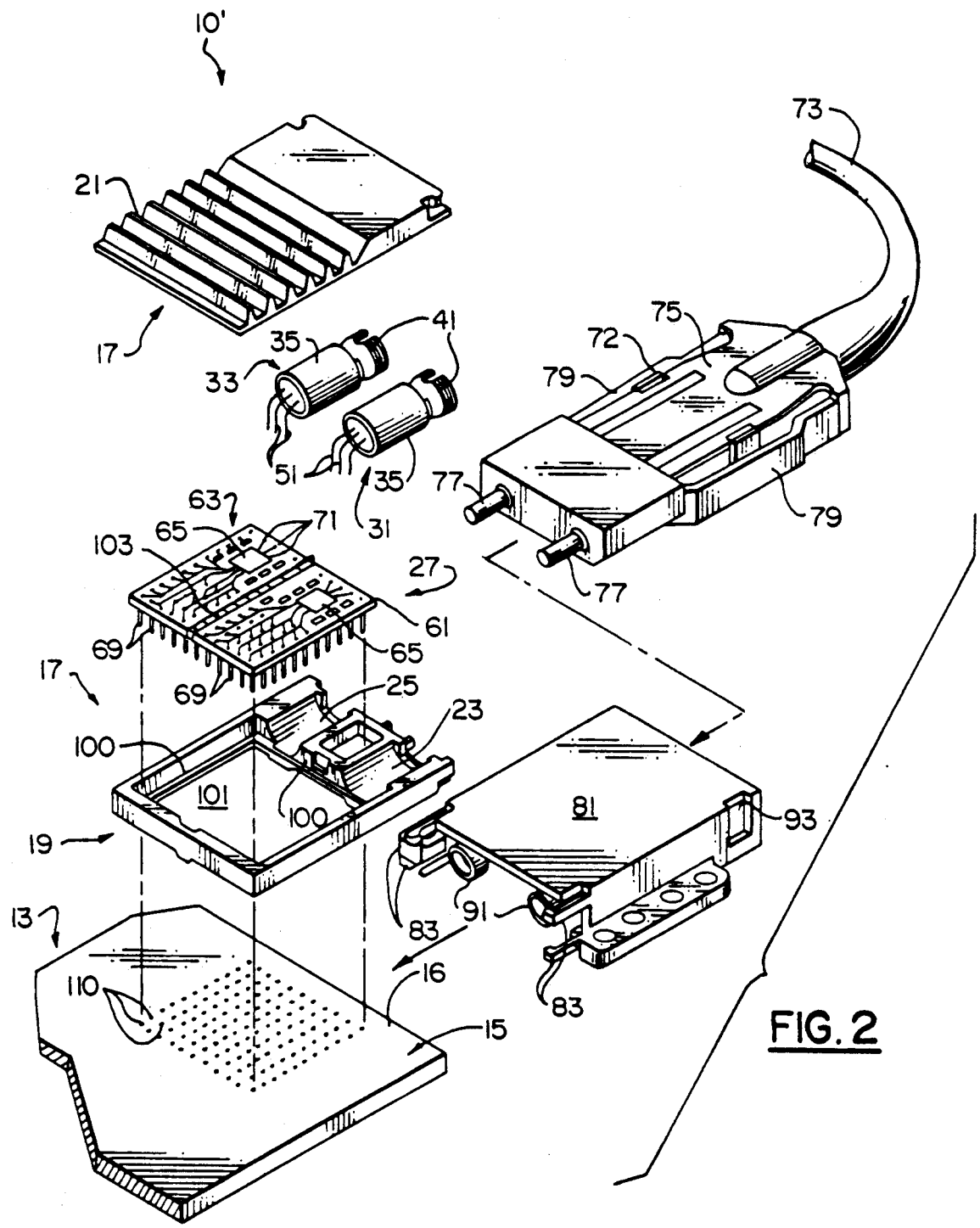
FIG. 2 is an exploded perspective view of an optoelectronic assembly in accordance with another embodiment of the invention, this assembly illustrated as being adapted for receiving a common optical connector containing therein two optical fiber components.
Figure 3:
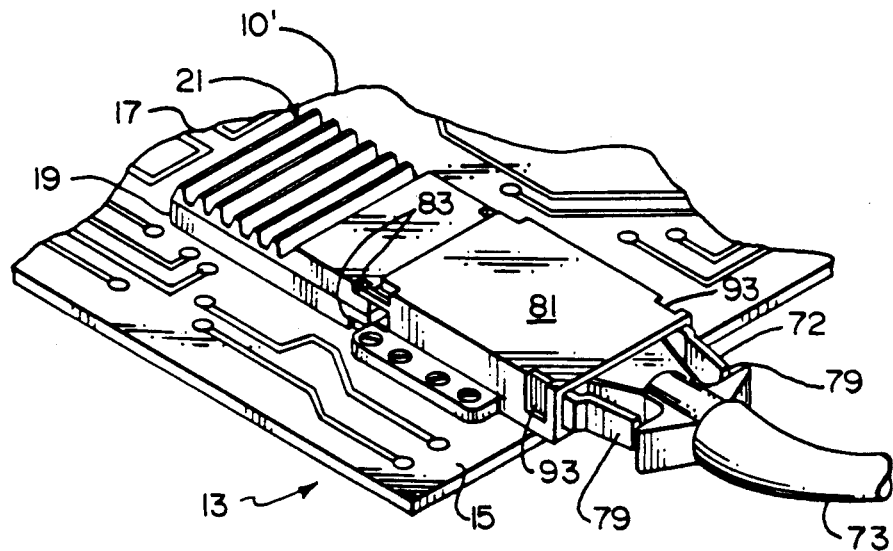
FIG. 3 is a partial perspective view of the optoelectronic assembly of FIG. 2 in assembled form and positioned on an electrical circuit member (e.g., printed circuit board)
Figure 4:
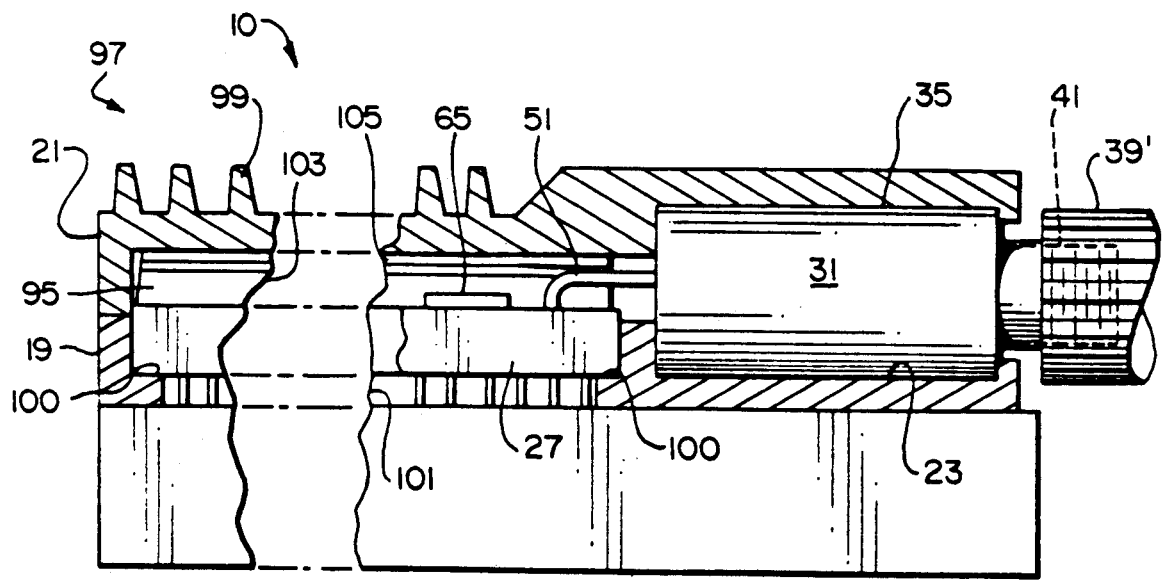
FIG. 4 is a side elevational view, in section and on an enlarged scale, of the optoelectronic assembly of FIG. 1, showing the assembly's housing mounted on the electrical circuit member.

Assembly 10 includes a housing 17 of two-part construction. Housing 17 is preferably metallic (e.g., stainless steel, aluminum, or copper) and includes a base portion 19 and a cover portion 21 designed for being secured to the base portion 19 (see, e.g., FIGS. 3 and 4). Base portion 19, of substantially rectangular configuration, includes a pair of receptacle portions 23 and 25 of substantially semicylindrical configuration. Each of these receptacle portions is designed for accommodating a respective optoelectronic device to thus strategically position the devices within housing 17 in a precise form of alignment. Such alignment is considered essential, particularly when assembly 10 is to be optically coupled to combined (duplex) optic means (FIG. 2). Such alignment is also considered significant to assure positive, sound electrical connections between these devices and the substrate member (27) of the invention. Base portion 19, as shown in FIG. 4, is designed for resting atop an upper surface 16 of circuit board 15 when assembly 10 is joined thereto. Each of the illustrated receptacle portions in portion 19, as stated, is of substantially semicylindrical configuration. Further, these receptacle portions lie substantially parallel to one another and are spaced slightly apart in base portion 19. Also stated, each receptacle portion is designed for having one of the invention's optoelectronic devices positioned therein. These devices are represented by the numerals 31 and 33 in the drawings. Each device, as shown, includes a substantially cylindrical container for its outer housing and includes therein the necessary components (not shown) to satisfactorily perform the functions required. In FIG. 1, device 31, designed for being positioned within receptacle portion 23, is adapted for receiving electrical data signals from respective circuitry on substrate 27 and for converting these electrical signals to optical data signals for transmittance through a respective optical fiber member 37' connected thereto. Such an optical fiber member may be one currently available in the art and which includes a suitable connector end 39' thereon adapted for being secured to (e.g., screwed onto) a projecting end 41 of device 31. Further description of this optical fiber component is thus not deemed necessary. It is understood, however, that such a component will include at least one optical fiber therein having an end section (e.g. ferrule) 43' which is designed for being strategically positioned within device 31 in precise alignment with respective element therein.

Device 31 thus serves as a transducer for converting electrical signals from substrate 27 to desired optical data for passage outwardly through fiber 37'. In this capacity, device 31 serves as a transmitter of optical signals through optical fiber 37'. Preferably, device 31 comprises a light emitting diode (LED) or a laser (not shown), both of known construction. Typically, a complete optoelectronic device of this type includes a die (semiconductor) which comprises an emitter, a header for providing mechanical support to the emitter, a lens for focusing light output generated by the LED or laser, and suitable electrical connections (illustrated in the drawings as conductor wires 51). Understandably, device 31 is electrically connected to circuitry on substrate 27 by these conductor wires (e.g., copper). Device 31 is particularly designed for receiving parallel data from the information system to which circuit member 15 is connected, said parallel data being serialized by an appropriate serializer (not shown) and then supplied directly to device 31 by wires 51. Electrical interconnection between device 31 and the circuitry which forms part of circuit member 15 (see FIG. 5) is provided by substrate 27. Specifically, substrate 27 includes two circuitized sections 61 and 63, each including appropriate circuitry and discreet devices, including at least one semiconductor chip 65 as part thereof. The circuitry of each circuitized section 61 and 63 is electrically connected to respective conductive pins 69 which project from beneath the substrate and ar designed for being electrically connected to circuit board 15 in a manner defined below.

Accordingly, the circuitry of the first circuitized section 61 serves to appropriately connect respective circuitry within board 15 to the conductive wiring 51 of device 31, this wiring preferably secured to appropriate circuit elements (e.g., conductor pads 71) found on the upper surface of substrate 27 and within section 61. Even more particularly, each projecting end of wiring 51 is soldered to these pads to provide the appropriate electrical connections. One example of such a pad is also shown in FIG. 5.

Thus it is seen that the base portion of housing 17 serves to precisely align device 31 not only with respect to the corresponding optical fiber but also with respect to a designated location on the substrate's respective circuitized section (61) such that sound electrical connections may be made thereto. The housing also serves to align device 31 relative to the adjacent device 33.

As further shown in FIG. 1, optoelectronic assembly 10 further includes the second optoelectronic device 33 which, similarly to the first device 31, is positively seated within base portion 19 of the invention's housing and designed for being electrically connected (through wiring 51) to the second circuitized section (63) of substrate 27. Such an electrical connection between the device's wiring 51 and respective circuitry on section 63 is preferably achieved in a similar fashion to that for wiring 51 of device 31. The circuitry of circuitized section 63, like that of section 61, is located on an upper surface of the dielectric substrate (e.g., ceramic) of member 27 and is electrically coupled to conductive pins 69 in a similar fashion to that of a circuitry of section 61. Thus, these pins are also utilized to electrically connect the circuitry at this portion of substrate member 27 with corresponding circuitry within/upon board 15. Device 33 is designed for receiving optical data signals from a second optical fiber 37, which, like optical fiber 37, includes a connector 39' or the like at the end thereof, as well as a projecting end (ferrule) 43 for being precisely aligned within the container 35 of device 33. The connecting end section of fiber 39' is also designed for being firmly attached (e.g. screwed onto) a projecting end 41 of container 35, which end 41, like end 41 for device 31, projects slightly from the periphery of the containing, two-part housing 17. This extension is best seen in FIG. 4.

Device 33 includes therein a die which functions as a detector, a header for mechanical support, a lens for focusing the optical input onto the device's die, and projecting wiring 51 to provide the aforementioned electrical connections. The die as used herein, like the die used in device 31, may comprise any suitable material for the emission or detection of photons (depending on the function described), including silicon or gallium arsenide. Such components are known in the art and further description is thus not believed necessary. Particularly, the respective die may be located on the aforementioned header member which in turn may include the projecting wiring 51 connected thereto and/or projecting therefrom. Device 33, in addition to being a transducer as is device 31, thus functions as a receiver of optical data signals (from fiber member 37) and provides the function of converting these incoming signals from the optical fiber to electrical data signals for passage (transmittance) to the second circuitized section 63 of the ceramic substrate member 27. Preferably, the internal circuitry of device 33 further includes amplification circuitry for amplifying the relatively weak electrical signals prior to subsequent transmission. Further, these signals are also deserialized (by appropriate circuitry, not shown) in order to provide parallel data output through board 15. Such amplification and deserialization may be accomplished using known electrical components and further description is thus believed not necessary. However, it is to be understood that this circuitry, particularly the deserializing portion, may be located on and form part of the circuitry of the second circuitized portion 63 on the invention's substrate. Essentially, the circuitry used in both the receiving and transmitting sections of substrate 27 may be constructed to include passive components together with other discrete active components and selected integrated circuit components. The preferred receiving component in device 33 is a photodiode, several of which are known in the art and added description of these is also not deemed necessary.

In FIG. 2, there is shown an optoelectronic assembly 10' in accordance with another embodiment of the invention. Assembly 10' includes many of the similar components shown for assembly 10 in FIG. 1 and these components are thus similarly numbered. Assembly 10', as shown, is particularly adapted for receiving a fiber optic connector 72 of the duplex variety. Specifically, connector 72 serves as a common connector to house therein a pair of optical fibers (e.g., fibers such as 37 and 37'), each of which is designed for being optically connected to a respective one of the optoelectronic devices 31 and 33. Thus, both fibers are encased within a common sheath 73 which projects from a rear section of the common housing 75. At the forward end of housing 75 can be seen two projecting ferrules 77 which each include a respective one of optical fibers therein. Common connectors of this type are known in the art and further description is not believed necessary. The common connector 72 depicted in FIGS. 2 and 3 may also include latch segments 79 on opposite sides thereof (for the purpose defined below). To accommodate common connector 72, the invention's housing 17 includes an extension section 81 of substantially boxlike configuration (FIGS. 2 and 3) and which is designed for being attached (using extending clip sections 83) to a corresponding end section of the assembled housing 17. This arrangement is best shown in FIG. 3. As also shown in FIG. 3, extension section 81 may be directly attached to the circuit board 15 to thus provide additional rigidity at this portion of the invention. In operation, the common connector 72 is inserted within an end of extension section 81 (see the arrow in FIG. 2) until each of the respective ferrules 77 is inserted within a depending alignment section 91 (two shown in FIG. 2). These ferrules pass through the hollow sections 91 and are inserted in aligned fashion within the hollow, open ends 41 of devices 31 and 33.

It is also within the scope of the invention to utilize extension section 81 to accommodate individual fiber members 37 and 37' wherein said members are not contained within a common connector. Housing 17, when assembled, thus serves to both accurately align devices 31 and 33 as well as assure alignment of the corresponding common connector being inserted therein. Final retention of connector 72 will be provided using latches 79, which engage corresponding slots 93 in the end of extension section 81. It is also possible within the scope of the invention to extend extension section 81 beyond the outer periphery of circuit board 15 such that section 81 is not attached thereto. In such an arrangement, which would allow for greater utilization of board space, only housing 17 (via substrate 27) would be secured to the board.

In FIG. 4, a much enlarged cross-sectional view, in elevation, of the assembly 10 of FIG. 1 is shown. It is also understood that this cross-section also applies to the embodiment in FIG. 2; however, extension section 81 is not shown. In FIG. 4, the cover portion 21 of housing 17 is shown as being secured to base portion 19 with one (31) of the optoelectronic devices securely positioned within the receptacle portion 23 defined by base portion (19) and the internal periphery of cover portion 21. Thus, both the base and cover include matching semicylindrical indentations which, when the housing is assembled, serve to define a pair of substantially cylindrical openings within the housing to seat (and retain) both devices 31 and 33. Cover 21 may be secured to base portion 19 using an appropriate adhesive (e.g., conductive epoxy). Preferably, the cover is welded or soldered to the base. When so attached, these two portions of housing 17 form a seal about the internal chamber 95 in which are positioned the invention's substrate and circuitry and assorted electronic components mounted thereon (e.g., die 65). To provide appropriate sinking for heat generated by such components, cover portion 21 is shown to also include heat sinking means 97 (e.g., a plurality of spaced, upstanding fins 99) therein. As stated above, housing 21 is also of metallic material (e.g., aluminum, copper, and stainless steel) to thus further assure effective heat sinking. As also seen in FIG. 4, substrate member 27 rests upon a ledge 100 formed about the internal lower periphery of base portion 19. This ledge thus serves to have the bottom part of the planar ceramic substrate member 27 positively seated thereon. Additionally, a sealant material (not shown) is also preferably utilized to provide a seal for this portion of the invention. For example, such sealant material may be initially placed on ledge 100 and the planar ceramic substrate positioned thereon. As is also seen in FIGS. 1, 2 and 4, ledge portion 100 defines a rectangular opening 101 within base portion 19. It is through this opening that the conductive pins 69 (arranged in a rectangular pattern) of substrate member 27 project so as to be positioned within corresponding apertures 110 in board 15 (see also FIG. 5) or surface attached (e.g., soldered) to provided conductor pads on the upper surface of the board. Such pads may be copper.

In comparing FIGS. 1,2,4 and 6, the invention is shown to further includes a radio frequency (RF) shield member 103 located on an upper surface of the ceramic substrate 27 between circuitized section 61 and 63. This shield 103, as best seen in FIG. 6, includes a flexible (curvilinear) upper portion 105 which engages cover portion 21 of housing 17 when the cover is attached to base portion 19. The flexible portion 105 thus accommodates for dimensional tolerances in both housing portions to further facilitate assembly of the invention. Shield 103 serves to substantially prevent RF interference between circuitized sections 61 and 63 during operation of the assembly of the invention. Further, the shield may be electrically connected to one or more projecting pins 69 of substrate member 27, said pins in turn electrically coupled to ground (e.g., to a ground plane within board 15) such that the metallic housing 17 of the invention is also electrically ground. Shield 103 thus provides a dual function (RF shielding and electrical grounding) for the invention.

In FIG. 5 there is shown a much enlarged sectional view indicating one example of the substrate and electrical circuit members for use in the invention. As shown in FIG. 5, substrate 27 includes the aforementioned, substantially planar ceramic substrate member 109 having pins 69 securely positioned therein. Only two pins are represented in FIG. 5 but is understood that several others are preferably used. In one example of the invention, a total of about 150 pins 69 were used for member 27. This is not meant to limit the invention, however, as other quantities are possible. Each pin 69 is preferably copper and inserts within (and is connected to, e.g., soldered) a corresponding aperture 110 within board 15. Such apertures may comprise plated-through-holes (PTH) as are known in the printed circuit board art. Accordingly, the pins may be electrically coupled to respective layers of circuitry found within such a multilayered structure as indicated in FIG. 5. For example, if the pin 69 to the left in FIG. 5 is to serve as a power pin (connected to an appropriate power source) the pin would be connected to the associated power plane 113 found in the multilayered board 15. If the pin 69 is to serve as a signal pin (for example, the pin to the right in FIG. 5), this pin would be electrically connected to a respective signal plane 115 also found in the multilayered structure of board 15. It is to be understood that the above are representative examples only and that alternative layers (and numbers thereof) and associated structures may be utilized for a multilayered board as shown herein. This structure as shown is thus not meant to limit the invention.

By the term pin as used herein is meant to include metallic elements of the configuration depicted herein as well as other conductive elements of different configurations (e.g., pad-shaped terminals adapted for being soldered or similarly joined to respective circuit members, including other pad-shaped conductors, located on the upper surface of substrate 27). Such pad-shaped terminals may be of copper or other highly conductive materials.

As further shown in FIG. 5, the upper surface of ceramic substrate member 27 includes conductive circuitry 117 thereon. This circuitry may comprise a first conductive layer 119 (e.g. which may serve as a ground plane), a second dielectric layer (e.g. polyimide) 121 located substantially over the ground plane 119, and a second (or upper) conductive layer 123. Layer 123 may comprise several individual circuitized portions (signal lines) to respective devices and other components which form part of substrate member 27 (and described above). Accordingly, each pin as shown in FIG. 5 is preferably electrically connected to a separate, spaced conductor 123, depending on the function desired. The use of multilayered circuitry on ceramic substrates is known in the art and further description is not believed necessary. It is understood that this technology may be directly utilized in producing the invention and will thus expedite such manufacture. As also shown in FIGS. 5, each of the pins preferably includes a head portion 125 of substantially bulbous configuration and which is electrically connected to the respective separate upper conductor 123 by an appropriate conductor material (e.g. solder 127).

It is also understood that the invention is fully capable of being produced without the need for multilayered circuitry in that, in its broadest concept, only a singular conductive layer need be utilized to provide the appropriate electrical connections for substrate number 27. The above multilayered technology is preferred, however, because of its greater capacity. Such conductive layers, including the ground layer 119, may be comprised of copper or alloys thereof (e.g., chromium-copper-chromium). Such materials are known in the art, as stated, and further description is again not believed necessary.

To provide enhanced electrostatic discharge (ESD) and/or electromagnetic interference (EMI) protection for the circuitry within assembly 10 (e.g., from external electrical noise), it is possible to provide an additional ground plane (e.g., in the form of a substantially solid copper layer) on the bottom surface of the ceramic substrate 27.

In FIG. 7, there is shown an alternative means for electrically connecting one of the optoelectronic devices (e.g., 31) with the associated circuitry (not shown) on the upper surface of substrate member 27. In this embodiment, the device's conductive wiring are shown a being encased within a flexible dielectric (e.g., polyimide) to form a flexible tape member 131. Tape member 131 includes the spaced wiring (e.g., copper) 133 therein. Wiring 133 includes exposed end portions 135 which in turn are connected (e.g., soldered) to the respective conductors (not shown) of the optoelectronic device and those (e.g., conductor pads 71) located on the upper surface of substrate 27. This thus represents another means for facilitating assembly of the invention. It is also understood that both devices 31 and 33 can be connected using such a flexible tape member as depicted in FIG. 7. Tape 131 also serves to substantially reduce electromagnetic interference as may be produced if exposed conductor wires are utilized at this location in the invention. Encased conductive wiring 133 as shown in FIG. 7 will not produce such interference to a level significantly enough to adversely affect the operational characteristics of the remaining various electronic components used within the invention. Although only three conductors 133 are shown in FIG. 7 (and FIGS. 1 and 2), it is understood that the invention is not limited to this number. For example, when using a flexible tape such as tape 131, four conductors may be utilized, including anode and cathode conductors substantially centrally located within the flat tape and a pair of ground conductors running parallel thereto, each ground located along an outer peripheral side of the tape. The tape member could also be a multilayered structure including at least one ground layer as part thereof to thereby provide enhanced ESD/EMI protection for the conductors within tape member 131. Additionally, it is also possible in the embodiments depicted in FIGS. 1 and 2 to use only two conductive wires 51 for each device, these functioning only as the anode and cathode conductors. Grounding can be provided internally of each device to the conductive (metallic) casing 35 of each device, this casing thus being electrically ground by virtue of the metallic housing 17 to which each casing is electrically connected being grounded (the device's conductive housings physically contacting the housing when located therein).

Thus there has been shown and described an optoelectronic assembly which is capable of operating at relatively high frequencies (e.g., from about five megahertz to two gigahertz) to provide effective bidirectional data transmission between appropriate fiber optic means and an associated electrical circuit member (e.g., multilayered printed circuit board having electrically isolated layers of circuitry therein). In two examples of the invention, frequencies of about 200 megahertz and about 1.1 gigahertz, respectively, were observed. The invention as defined is thus capable of high capacity operation and is also readily adaptable to mass production, thereby assuring a final product capable of being produced at minimal cost.

While there have been shown and described what are at present considered the preferred embodiments of the invention, it will be obvious to those skilled in the art that various changes and modifications may be made therein without departing by the scope of the invention as defined by the appended claims.

What is claimed is:

1. An optoelectronic assembly for providing bidirectional data transmission between fiber optic means and an electrical circuit member, said assembly comprising:
   a housing adapted for being positioned on said circuit member and including a base portion having first and second receptacle sections therein, and a cover portion for being attached to said base portion;
   a first optoelectronic device positioned within said first receptacle portion of said housing for receiving electrical data signals and for converting said electrical data signals to optical data signals;
   a second optoelectronic device positioned within said second receptacle portion of said housing for receiving optical data signals and for converting said optical data signals to electrical data signals; and
   a substrate member located within said housing adjacent said first and second optoelectronic devices and adapted for being electrically coupled to said electrical circuit member when said housing is positioned on said circuit member, said substrate member including first and second circuitized sections, said first circuitized section being electrically connected within said housing to said first optoelectronic device for providing said electrical data signals thereto and said second circuitized section being electrical connected within said housing to said second optoelectronic device for receiving said electrical data signals therefrom.

2. The optoelectronic assembly according to claim 1 wherein said first optoelectronic device comprises an LED.

3. The optoelectronic assembly according to claim 1 wherein said first optoelectronic device comprises a laser.

4. The optoelectronic assembly according to claim 1 wherein said second optoelectronic device comprises a photodiode.

5. The optoelectronic assembly according to claim 1 wherein said electrical circuit member comprises a multilayered circuit member including electrically separated layers of circuitry therein.

6. The optoelectronic assembly according to claim 1 wherein said assembly has an operational frequency within the range of from about five megahertz to about two gigahertz.

7. The optoelectronic assembly according to claim 1 wherein said cover portion of said housing includes heat sinking elements therein.

8. The optoelectronics assembly according to claim 7 wherein each of said heat sinking elements is an upstanding fin.

9. The optoelectronic assembly according to claim 1 wherein each of said first and second circuitized sections of said substrate are electrically connected to said first and second optoelectronic devices, respectively, by a plurality of conductor wires.

10. The optoelectronic assembly according to claim 9 wherein each of said plurality of conductor wires is contained within a flexible dielectric material to thereby form a flexible cable.

11. The optoelectronic assembly according to claim 1 wherein said substrate member includes shield means thereon, said shield means located between said first and second circuitized sections of said substrate to provide RF shielding therebetween.

12. The optoelectronic assembly according to claim 11 wherein said shield means includes a flexible upper portion for engaging said cover portion of said housing when said cover portions is attached to said base portion.

13. The optoelectronic assembly according to claim 12 wherein said shield means is electrically connected to electrical ground circuitry within said electrical circuit member, thereby electrically grounding said housing during operation of said assembly.

14. The optoelectronic assembly according to claim 1 wherein said base portion of said housing includes a ledge portion therein, said substrate member located within said housing being positioned on said ledge portion.

15. The optoelectronic assembly according to claim 14 wherein said ledge portion defines an opening within said housing, said substrate member being electrically coupled to said electrical circuit member through said opening.

16. The optoelectronic assembly according to claim 15 wherein said substrate member is secured to said ledge portion to thereby provide a seal for said opening.

17. The optoelectronic assembly according to claim 16 wherein said substrate member is secured to said ledge portion by a sealant material.

18. The optoelectronic assembly according to claim 15 wherein said substrate member comprises a plurality of conductive pins, said pins projecting through said opening and adapted for being electrically coupled to respective circuitry within said electrical circuit member.

19. The optoelectronic assembly according to claim 1 wherein said first optoelectronic device includes an outer container and an end extending from said container, said container securely positioned within said first receptacle portion of said housing.

20. The optoelectronic assembly according to claim 19 wherein said fiber optic means includes a pair of optical fiber members, said extending end of said first optoelectronic device adapted for being optically coupled to one of said optical fiber members to provide said optical data signals converted from said electrical data signals to said optical fiber member.

21. The optoelectronic assembly according to claim 20 wherein said second optoelectronic device includes an outer container and an end extending from said container, said container of said second optoelectronic device being securely positioned within said second receptacle portion of said housing, said extending end of said second optoelectronic device adapted for being optically coupled to another of said optical fiber members for receiving said optical data signals which said second optoelectronic device converts to said electrical data signals.

22. The optoelectronic assembly according to claim 21 wherein said housing of said optoelectronic assembly further includes an extension section located adjacent said base and cover portions.

23. The optoelectronic assembly according to claim 22 wherein said pair of optical fiber members are contained within a common connector, said extension section of said housing adapted for receiving said common connector.

24. The optoelectronic assembly according to claim 22 wherein said extension section is connected to said base and cover portions of said housing.

25. The optoelectronic assembly according to claim 24 wherein said extension section is adapted for being secured to said electrical circuit member.

* * * * *